Sept. 23, 1941. G. HUNT 2,256,713
CLUTCH DRIVEN PLATE
Filed April 15, 1940

Inventor
George Hunt
By Blackmore, Spencer & Hurd
Attorneys

Patented Sept. 23, 1941

2,256,713

UNITED STATES PATENT OFFICE 2,256,713

CLUTCH DRIVEN PLATE

George Hunt, Dayton, Ohio, assignor to General Motors Corporation, Detroit, Mich., a corporation of Delaware Application April 15, 1940, Serial No. 329,590

3 Claims. (Cl. 192—107)

This invention relates to clutches and particularly to friction clutches such as are used in motor vehicles to releasably connect the engine shaft and the input change speed transmission shaft.

An object of the invention is to improve the driven member of such a clutch, the member carried by the input shaft of the change speed transmission.

Another object is to provide improved means to cushion the engaging movement of the clutch members to avoid grabbing action.

Other objects will be understood from the description which follows.

Figure 1:
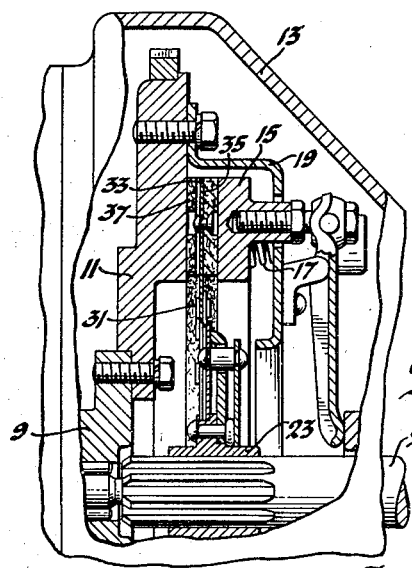
Figure 1 is a transverse section through a clutch having my invention embodied therein.
Figure 3:
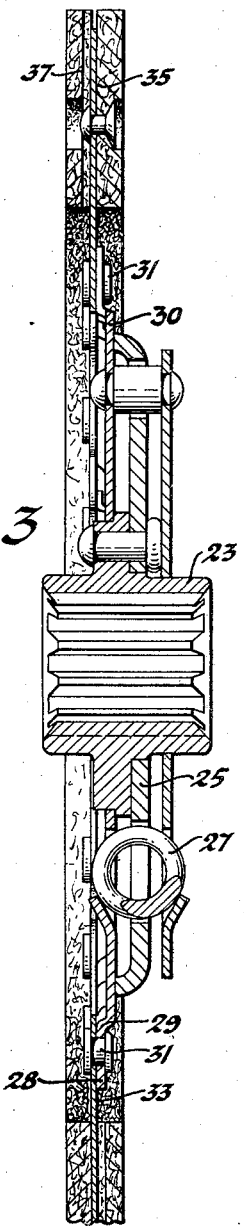
Figure 3 is a section on line 3—3 of Figure 2.
Figure 2:
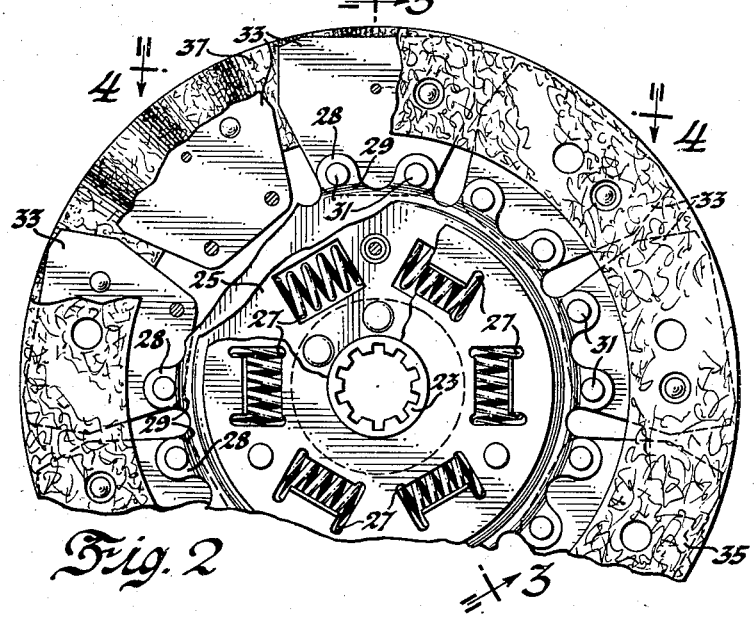
Figure 2 is a view in elevation, partly broken away, to show the novel driven member.

Referring by reference characters to the drawing it will be seen that the engine shaft 9 carries a flywheel 11 housed by casing 13. A pressure plate 15 is moved toward the flywheel by springs 17 having for their abutment an inner cover 19 secured to the flywheel. The transmission input shaft 21 carries a hub 23. Numeral 25 designates a disc secured to the hub 23. What may be called an intermediate plate 30 has a torque cushioned relation with the hub disc through the provision of a circular series of springs 27. The periphery of plate 30 has a plurality of radial tongues 28, the tongues being grouped in pairs. Adjacent the root of each tongue is a bend 29 so that the tongues are spaced axially from the plane of the plate. To the two tongues of each pair is secured as at 31 a segmental plate of spring steel marked 33. These segments form an interrupted marginal region, the region located between the flywheel and pressure plate. The several segments are normally flat. On either side of the ring formed by the segments are annular friction facings 35 and 37. The sides of the facings adjacent the flywheel and pressure plate are flat and parallel. The sides of the facings adjacent the segments are formed with ridges and valleys, the ridges of one facing being opposite a valley of the other. Attachment is made to the segment where certain of the ridges contact the segment.

Figure 4:
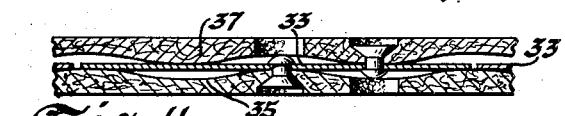
Figure 4 is a section on line 4—4 of Figure 2, this view showing the relative positions of the parts when the clutch is released.
Figure 5:
Figure 5 is a similar section showing the relative positions of the parts when the clutch is engaged.

It will be seen from Figures 4 and 5 that the spring segments are flexed when the clutch is engaged. To permit such flexing the axially spaced relation of the inner edge of the segments and the intermediate plate as explained above is provided. It is therefore possible for the segment to bend as shown by Figure 5, the bending being possible between the points of attachment at 31. It may be explained that the bent regions of the spring segments are but little removed from the original plane of the segments and that a slight twisting of the tongues 28 will accommodate the bending. By this simple expedient it becomes unnecessary to resort to the manufacture of segments with recessed regions between their outer and inner regions to permit the bending.

I claim:

1. A driven clutch plate having a hub, an intermediate annulus operatively connected thereto, said annulus having at its outer edge a plurality of offset tongues arranged in pairs, a yielding segment attached to each pair of tongues, the segments together forming a yieldable interrupted ring, friction facings secured to the opposite surfaces of said segments, said facings having their adjacent surfaces formed with ridges and valleys, the ridges of one facing being opposite the valleys of the other.

2. The invention defined by claim 1, said segments having inner edges extending substantially as chords, said inner edges being spaced axially from said annulus by the offset tongues.

3. A driven clutch plate having a hub, an intermediate annulus operatively connected thereto, said annulus having at its outer edge a plurality of axially offset projections, a yielding segment attached to a pair of projections, the segments together forming a yieldable interrupted ring, friction facings secured to the opposite surfaces of said segments, said facings having their adjacent surfaces formed with ridges and valleys, the ridges of one facing being opposite the valleys of the other.

GEORGE HUNT.